(12) United States Patent
Zhang et al.

(10) Patent No.: US 6,319,404 B1
(45) Date of Patent: *Nov. 20, 2001

(54) PROCESS FOR THE PREPARATION OF POROUS MATERIAL AND POROUS MATERIAL

(75) Inventors: Husheng Zhang, Ibaraki; Takanori Anazawa, Chiba; Yasuko Watanabe, Chiba; Miyuki Miyajima, Chiba, all of (JP)

(73) Assignees: Dainippon Ink Chemicals, Inc., Tokyo; Kawamura Institute of Chemical Research, Sakura, both of (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/842,056

(22) Filed: Apr. 23, 1997

(30) Foreign Application Priority Data

Apr. 26, 1996 (JP) .................................................. 8-107299
Mar. 17, 1997 (JP) .................................................. 9-062904

(51) Int. Cl.$^7$ ........................... B01D 71/12; B01D 71/56; B01D 71/68

(52) U.S. Cl. ................. 210/500.29; 210/500.27; 210/500.34; 210/500.35; 210/500.38; 210/500.39; 210/500.41; 210/500.42; 264/41; 264/48; 264/49; 264/425; 428/315.7

(58) Field of Search ........................ 210/500.38, 500.42, 210/500.35, 500.39, 500.41, 500.29, 500.36, 500.34, 500.27, 500.23; 264/41, 425, 48, 49; 428/315.7

(56) References Cited

U.S. PATENT DOCUMENTS

| | | | |
|---|---|---|---|
| 3,567,810 | 3/1971 | Baker et al. | 264/41 |
| 4,618,533 | * 10/1986 | Steuck | 428/315.7 |
| 4,775,474 | 10/1988 | Chau et al. | 210/500.34 |
| 4,919,865 | * 4/1990 | Nelson | 264/45.1 |
| 5,158,721 | 10/1992 | Allegrezza, Jr. et al. | 264/41 |
| 5,236,588 | 8/1993 | Zhang et al. | 210/500.35 |
| 5,330,830 | * 7/1994 | Miyamori et al. | 210/500.35 |

FOREIGN PATENT DOCUMENTS

| | | |
|---|---|---|
| 2 124 973 A | 2/1984 | (GB) . |
| 62-201603 | * 9/1987 | (JP) . |
| 63-69845 | 3/1988 | (JP) . |

* cited by examiner

*Primary Examiner*—Ana Fortuna
(74) *Attorney, Agent, or Firm*—Armstrong, Westerman, Hattori, McLeland & Naughton, LLP

(57) ABSTRACT

A porous material is disclosed, made of a semi IPN type polymer alloy of a crosslinked polymer (A) obtained by the crosslinking polymerization of a crosslinking-polymerizable vinyl monomer and/or oligomer (a) with a non-crosslinked polymer (D) which is soluble in a solvent (B) capable of dissolving said monomer and/or oligomer (a) therein and subjecting said crosslinked polymer (A) to gelation but is insoluble in a coagulating solution (C) which is compatible with said solvent (B) but doesn't subject said crosslinked polymer (D) to gelation. A porous material excellent in mechanical strength as well as in heat resistance can be prepared. Various functional groups can be introduced into the surface of the porous material. Further, the pore diameter can be easily controlled. The porous material of the present invention is excellent in physical properties such as strength, hardness and heat resistance as well as in chemical and biological properties such as non-adsorptivity and selective adsorptivity of protein.

18 Claims, No Drawings

PROCESS FOR THE PREPARATION OF POROUS MATERIAL AND POROUS MATERIAL

FIELD OF THE INVENTION

The present invention relates to a novel process for the preparation of a porous material and a porous material prepared by the preparation process. The porous material according to the present invention can be used as a microfiltration membrane, ultrafiltration membrane, reverse osmosis membrane, dialysis membrane, adsorbent, bioreactor, biosensor, artificial organs, etc.

BACKGROUND OF THE INVENTION

Microporous membranes are used in filtration and separation of protein, colloid, bacteria, virus, salts, etc. in various separation processes used in the arts of chemical industry, electronic industry, pharmaceutical industry, food industry, disposal of waste liquid, medical treatment (including medical instrument such as artificial organs, examination), water purification, etc. Porous materials such as porous bead and porous fiber are used as adsorbents for substances, e.g., solvent or protein, dissolved in water, adsorbents for gaseous substance, fillers for chromatography, carriers for enzyme in bioreactor or biosensor, etc.

As the process for the preparation of a microporous membrane (hereinafter occasionally referred simply to as "membrane") there has been most widely used a so-called wet process which comprises shaping a polymer solution, optionally drying somewhat the surface of said polymer solution, and then allowing said polymer solution to come in contact with a coagulating solution miscible with the solvent in said solution so that the polymer is coagulated in a network pattern. However, the wet process is disadvantageous in that only a solvent-soluble-polymer, i.e., linear polymer can be used. The resulting membrane exhibits a poor heat resistance, pressure resistance and fastness to filtration (compaction). Further, the membrane can be hardly modified, making it difficult to prepare a hydrophilic membrane. If it is tried to prepare a hydrophilic membrane for the purpose of inhibiting fouling (drop of flux due to fouling of membrane), which is the greatest weak point in membrane filtration, the resulting membrane swells in water and thus exhibits a poor compaction resistance. Further, the polymer material comprising a hydrophilic group incorporated therein can swell in water during the preparation of the membrane, making it possible to prepare a membrane having a small pore diameter. Moreover, the resulting membrane is alcohol-soluble and thus can be hardly purified. Accordingly, the preparation of a hydrophilic membrane requires complicated steps of preparing a non-hydrophilic membrane and then surface-coating the non-hydrophilic membrane to render it hydrophilic.

On the other hand, U.S. Pat. No. 5,236,588 discloses a process for the preparation of a microporous membrane which comprises shaping a mixture of an energy ray-polymerizable monomer and/or oligomer and a poor solvent which is miscible with said energy ray-polymerizable monomer and/or oligomer but doesn't dissolve or subject said energy ray-polymerizable monomer and/or oligomer thereinf to gelation, optionally drying somewhat the surface of the mixture, and then irradiating the material with energy ray to effect polymerization and phase separation at the same time. In accordance with this process, the use of a multifunctional compound as the monomer and/or oligomer makes it possible to prepare a crosslinked polymer membrane. Thus, a membrane having excellent heat resistance and compaction resistance can be obtained. Further, the addition of a hydrophilic material to the monomer and/or oligomer makes it easy to prepare a hydrophilic membrane. However, this process, too is disadvantageous in that if it is tried to prepare a hydrophilic membrane having a small cut-off molecular weight, only a membrane having a small flux can be obtained.

The foregoing difficulties are encountered in membranes as well as in porous materials such as porous bead and porous fiber.

SUMMARY OF THE INVENTION

An object of the present invention is to provide a porous material having excellent fouling resistance, heat resistance and compaction resistance and a widely and arbitrarily designed pore diameter and a process for the preparation thereof. Another object of the present invention is to provide a porous material adapted for adsorption having broadly controlled surface properties and pore diameter and excellent heat resistance and strength and a process for the preparation thereof.

The inventors made extensive studies of the solution to the foregoing problems. As a result, it was found that a process for the preparation of a porous material which comprises shaping a polymerizable solution (I) comprising as essential components a crosslinking-polymerizable vinyl monomer and/or oligomer (a) and a solvent (B) capable of dissolving said monomer and/or oligomer (a) therein and subjecting a crosslinked polymer (A) obtained by crosslinking polymerization of said monomer and/or oligomer (a) to gelation, crosslinking-polymerizing the polymerizable solution (I) to produce a gel formed product of crosslinked polymer (A), and then allowing the gel formed product to come in contact with a coagulating solution (C) which is compatible with said solvent (B) but doesn't subject the crosslinked polymer (A) to gelation so that it is coagulated has the following features:

(i) Excellent fouling resistance, heat resistance and compaction resistance can be provided and the pore diameter can be arbitrarily designed to a wide range in the preparation of a membrane;

(ii) In the preparation of a porous material adapted for adsorption, the surface properties and pore diameter can be widely controlled. Thus, a porous material having an excellent heat resistance and strength can be obtained; and (iii) Among the porous materials obtained according to the foregoing preparation process, a porous material made of a semi IPN (interpenetrating polymer network) type polymer alloy of a crosslinked polymer (A) with a non-crosslinked polymer (D) which is soluble in the solvent (B) but insoluble in the coagulating solution (C) is excellent in physical properties such as strength, hardness and heat resistance as well as in chemical and biological properties such as non-adsorptivity and selective adsorptivity of protein and thus is particularly desirable. The present invention has been thus worked out.

In order to solve the foregoing problems, the present invention provides the following inventions:

(1) A process for the preparation of a porous material, which comprises shaping a polymerizable solution (I) containing as essential components a crosslinking-polymerizable vinyl monomer and/or oligomer (a) and a solvent (B) capable of dissolving said monomer and/or oligomer (a) therein and subjecting a crosslinked polymer (A) obtained by the crosslinking polymerization of said monomer and/or oligomer (a) to gelation, crosslinking-polymerizing the polymerizable solution (I) to produce a gel formed product of crosslinked polymer (A), and then allowing the gel formed product to come in contact with a coagulating solution (C) which is compatible with said solvent (B) but doesn't subject said crosslinked polymer (A) to gelation so that it is coagulated and rendered porous;

(2) The process for the preparation of a porous material defined in Clause (1), wherein said polymerizable solution (I) comprises a non-crosslinked polymer (D) which is soluble in said solvent (B) but insoluble in said coagulating solution (C).

(3) The process for the preparation of a porous material defined in Clause (2), wherein the content of said crosslinking-polymerizable vinyl monomer and/or oligomer (a) in the resin component contained in said polymerizable solution (I) is from 10 to 90% by weight.

(4) The process for the preparation of a porous material defined in any one of Clauses (1) to (3), wherein said crosslinking-polymerizable vinyl monomer and/or oligomer (a) comprises a multifunctional monomer and/or oligomer in an amount of not less than 10% by weight.

(5) The process for the preparation of a porous material defined in any one of Clauses (1) to (3), wherein said crosslinking-polymerizable vinyl monomer and/or oligomer (a) comprises a hydrophilic vinyl monomer and/or oligomer.

(6) The process for the preparation of a porous material defined in Clause (5), wherein the content of said hydrophilic vinyl monomer and/or oligomer in the resin component contained in said polymerizable solution (I) is from 5 to 50% by weight.

(7) The process for the preparation of a porous material defined in Clause (5), wherein said hydrophilic vinyl monomer and/or oligomer is a (meth)acrylic monomer and/or oligomer.

(8) The process for the preparation of a porous material defined in any one of Clauses (1) to (3), wherein said crosslinking-polymerizable vinyl monomer and/or oligomer (a) contains a vinyl monomer and/or oligomer having an amino acid skeleton in its molecule.

(9) The process for the preparation of a porous material defined in Clause (8), wherein the content of said vinyl monomer and/or oligomer having an amino acid skeleton in its molecule in the resin component contained in said polymerizable solution (I) is from 5 to 50% by weight.

(10) The process for the preparation of a porous material defined in Clause (8), wherein said vinyl monomer and/or oligomer having an amino acid skeleton in its molecule is a (meth)acrylic monomer and/or oligomer.

(11) The process for the preparation of a porous material defined in any one of Clauses (1) to (3), wherein said crosslinking-polymerizable vinyl monomer and/or oligomer (a) is one containing a vinyl monomer and/or oligomer having a saccharide skeleton in its molecule.

(12) The process for the preparation of a porous material defined in Clause (11), wherein the content of said vinyl monomer and/or oligomer having a saccharide skeleton in its molecule in the resin component contained in said polymerizable solution (I) is from 5 to 50% by weight.

(13) The process for the preparation of a porous material defined in Clause (11), wherein said vinyl monomer and/or oligomer having a saccharide skeleton in its molecule is a (meth)acrylic monomer and/or oligomer.

(14) The process for the preparation of a porous material defined in any one of Clauses (1) to (3), wherein said crosslinking-polymerizable vinyl monomer and/or oligomer (a) is a (meth)acrylic monomer and/or oligomer.

(15) The process for the preparation of a porous material defined in any one of Clauses (2) or (3), wherein said non-crosslinked polymer (D) comprises one or more polymers selected from the group consisting of polysulfone polymer, amide polymer, imide polymer, styrene polymer and cellulose polymer.

(16) The process for the preparation of a porous material defined in any one of Clause (1) to (3), wherein said solvent (B) is one having a boiling point of from 80° C. to 180° C.

(17) The process for the preparation of a porous material defined in any one of Clauses (1) to (3), wherein the shaping of said polymerizable solution (I) is followed by crosslinking polymerization by irradiation with energy ray.

(18) The process for the preparation of a porous material defined in Clause (17), wherein said energy ray is ultraviolet ray.

(19) The process for the preparation of a porous material defined in any one of Clauses (1) to (3), wherein said coagulating solution (C) is water or an aqueous solution.

(20) The process for the preparation of a porous material defined in any one of Clauses (1) to (3), wherein said polymerizable solution (I) is shaped into plane membrane, tubular membrane or hollow fiber membrane.

(21) A porous material, made of a semi IPN type (semi-interpenetrating polymer network type) polymer alloy of a crosslinked polymer (A) obtained by the crosslinking polymerization of a crosslinking-polymerizable vinyl monomer and/or oligomer (a) with a non-crosslinked polymer (D) which is soluble in a solvent (B) capable of dissolving said monomer and/or oligomer (a) therein and subjecting said crosslinked polymer (A) to gelation but is insoluble in a coagulating solution (C) which is compatible with said solvent (B) but doesn't subject said crosslinked polymer (A) to gelation.

(22) The porous material defined in Clause (21), wherein the content of said non-crosslinked polymer (D) is from 10% to 90% by weight.

(23) The porous material defined in Clause (21), wherein said crosslinked polymer (A) is a (meth)acrylic crosslinked polymer.

(24) The porous material defined in Clause (23), wherein said crosslinked polymer (A) is a polymer having a hydrophilic structure moiety.

(25) The porous material defined in Clause (23), wherein said crosslinked polymer (A) is a polymer having an amino acid skeleton.

(26) The porous material defined in Clause (23), wherein said crosslinked polymer (A) is a polymer having a saccharide skeleton.

(27) The porous material defined in any one of Clauses (24) to (26), wherein said non-crosslinked polymer (D) is a polysulfone polymer, an amide polymer, an imide polymer, a styrene polymer or a cellulose polymer.

(28) The porous material defined in any one of Clauses (21) to (26), which is a microporous membrane.

(29) The porous material defined in Clause (28), wherein said microporous membrane is an asymmetric membrane.

(30) The porous material defined in Clause (29), wherein said asymmetric membrane is one having a cut-off molecular weight of from 1,000 to 300,000.

(31) The porous material defined in any one of Clauses (21) to (26), wherein said porous material exhibits a contact angle of not more than 55 degrees with respect to water.

DETAILED DESCRIPTION OF THE INVENTION

The process for the preparation of the porous material according to the present invention will be described hereinafter.

The crosslinking-polymerizable vinyl monomer and/or oligomer (a) to be used in the preparation process of the present invention [hereinafter occasionally referred simply to as "monomer and/or oligomer (a)"] is a vinyl monomer and/or oligomer which can be polymerized to obtain a crosslinked polymer. Typical examples of such a vinyl monomer and/or oligomer include vinyl monomer and/or oligomer containing a bifunctional or higher multifunctional monomer and/or oligomer.

The oligomer employable herein indicates an oligomer containing a polymerizable vinyl functional group. Examples of such an oligomer include polymerizable polymers (prepolymers). The vinyl functional group is a vinyl-polymerizable functional group such as vinyl group, vinylidene group, acrylic group and methacrylic group. In these multifunctional monomers and/or oligomers, the various functional groups may not be the same or may contain polymerizable and/or crosslinked functional groups other than vinyl functional group.

The monomer and/or oligomer (a) to be used in the preparation process of the present invention is not specifically limited so far as it is a crosslinking-polymerizable vinyl monomer and/or oligomer. The monomer and/or oligomer (a) is preferably a vinyl monomer and/or oligomer which can undergo polymerization at a high rate and can be cured when irradiated with energy ray. Thus, the monomer and/or oligomer (a) is preferably an acrylic and/or methacrylic [hereinafter referred to as "(meth)acrylic"; this applies to (meth)acrylic group, (meth)acrylate, (meth) acryloyl, etc.) monomer and/or oligomer, i.e., monomer and/or oligomer containing (meth)acryloyl group.

Examples of the foregoing monomer include monofunctional monomers such as ethyl (meth)acrylate, hydroxyethyl (meth)acrylate, n-butyl (meth)acrylate, hexyl (meth) acrylate, 2-ethylhexyl (meth)acrylate, phenyl (meth) acrylate, phenylcellosolve (meth)acrylate, n-vinylpyrrolidone, isobornyl (meth)acrylate, dicyclopentenyl (meth)acrylate and dicyclopentenyloxyethyl (meth) acrylate, bifunctional monomers such as diethyleneglycol di(meth)acrylate, neopentylglycol di(meth)acrylate, 1,6-hexanediol di(meth)acrylate, polyethyleneglycol di(meth) acrylate, 2,2'-bis(4-(meth)acryloyloxypolyethylene oxyphenyl)propane and 2,2'-bis(4-(meth)acryloyloxypoly propyleneoxyphenyl)propane, trifunctional monomers such as trimethylolpropane tri(meth)acrylate and trimethylolethane tri(meth)acrylate, tetrafunctional monomers such as pentaerythritol tetra(meth)acrylate, and hexafunctional monomers such as dipentaerythritol hexaacrylate.

As the foregoing oligomer there may be used an oligomer having a weight-average molecular weight of from 500 to 50,000. Specific examples of such an oligomer include (meth)acrylic acid ester of epoxy resin, (meth)acrylic acid ester of polyester resin, (meth)acrylic acid ester of polyether resin, (meth)acrylic acid ester of polybutadiene resin, and polyurethane resin terminated by (meth)acryloyl group.

Needless to say, the monomer and/or oligomer (a) may be a mixture of these monomers and/or oligomers. In order to adjust the physical properties of the porous material, the monomer and/or oligomer (a) is preferably a mixture of a multifunctional monomer and/or oligomer and a monofunctional monomer and/or oligomer. In this case, the content of a bifunctional or higher multifunctional monomer and/or oligomer is preferably not less than 1% by weight, more preferably not less than 10% by weight, to facilitate the film forming of the polymer into a microporous membrane. The upper limit of the content of the multifunctional monomer and/or oligomer may be 100% by weight. The optimum content of the multifunctional monomer and/or oligomer depends on the molecular structure of the multifunctional monomer and/or oligomer as well as on the molecular weight of the multifunctional monomer and/or oligomer or the valency of the functional group. If the multifunctional monomer and/or oligomer has a small molecular weight or a high valency, its content is preferably relatively low.

If it is desired to prepare a hydrophilic porous material, particularly a fouling-resistant microporous membrane, the monomer and/or oligomer (a) preferably contains a hydrophilic vinyl monomer and/or oligomer, i.e., vinyl monomer and/or oligomer having a hydrophilic structure moiety, particularly a (meth)acrylic monomer and/or oligomer. The monomer and/or oligomer having a hydrophilic structure moiety may be multifunctional or monofunctional. The monomer and/or oligomer (a) is preferably a mixture of a monofunctional monomer and/or oligomer having a hydrophilic structure moiety and a multifunctional monomer and/or oligomer free of hydrophilic structure moiety because the degree of freedom of adjustment of the kind and amount of hydrophilic group can be increased while maintaining the desired physical properties.

The term "having a hydrophilic structure moiety" as used herein means "covalently having a hydrophilic group in molecule". Examples of the hydrophilic structure moiety include nonionic hydrophilic group such as polyethylene glycol group, polyoxymethylene group, hydroxyl group, saccharide-containing group and amide group, anionic hydrophilic group such as carboxyl group, sulfone group, phosphoric acid group and phosphorous acid group, cationic hydrophilic group such as amino group and ammonium group, and ampho-ionic group such as amino acid-containing group and ammonium/phosphoric acid-containing group.

The monomer and/or oligomer having a hydrophilic structure moiety may not exhibit hydrophilicity if the content of the hydrophilic structure moiety present in its molecule is small. The hydrophilic monomer and/or oligomer of the present invention needs to have a hydrophilic structure moiety in an amount such that the polymer obtained by the homopolymerization thereof exhibits a contact angle of not greater than 60 degrees with respect to water.

If a hydrophilic group is incorporated in the monomer and/or oligomer, the lower limit of the content of the monomer and/or oligomer having a hydrophilic structure moiety in the resin component (i.e., monomer, oligomer and polymer) contained in the polymerizable solution (I) is preferably not lower than 5% by weight, more preferably not lower than 10% by weight from the standpoint of balance of physical properties and hydrophilicity. The upper limit of the content of the monomer and/or oligomer having a hydrophilic structure moiety may be 100% by weight, preferably not higher than 50% by weight, more preferably not higher than 30% by weight.

On the other hand, if it is desired to prepare a microporous membrane having a low protein adsorptivity or a biocompatibility, the monomer and/or oligomer (a) preferably contains a vinyl monomer and/or oligomer having a saccharide skeleton in its molecule, particularly a (meth)acrylic monomer and/or oligomer. The monomer and/or oligomer having a saccharide skeleton in its molecule may be multifunctional or monofunctional. The monomer and/or oligomer having a saccharide skeleton in its molecule is preferably a mixture of a monofunctional monomer and/or oligomer having a saccharide skeleton and a multifunctional monomer and/or oligomer free of hydrophilic structure moiety and saccharide skeleton for the reasons mentioned above. The incorporation of other functional groups (e.g., sulfonic acid group) into the saccharide skeleton incorporated in the membrane can provide the membrane with new functions (e.g., antithrombicity, selective adsorptivity of protein, optical activity).

The term "having a saccharide skeleton in its molecule" as used herein means "having a saccharide skeleton covalently bound in its molecule". Examples of such a saccharide skeleton include monosaccharides such as glucose, galactose and mannose, and derivatives thereof (e.g., methyl glucoside). These monosaccharides may be cyclic (pentacyclic or hexacyclic) or chain-like. These saccharide skeletons may be disaccharides such as maltose, cellobiose, lactose and sucrose, derivatives thereof, oligosaccharide such as cyclodextrin, derivatives thereof, and polysaccharide such as starch.

The optimum content of the monomer and/or oligomer having a saccharide skeleton in the polymerizable solution (I) if a saccharide skeleton is incorporated therein is the same as in the monomer and/or oligomer having a hydrophilic structure moiety.

If a porous material having a bio-compatibility, a high protein adsorptivity or a selective adsorptivity of protein is prepared, the monomer and/or oligomer (a) preferably contains a vinyl monomer and/or oligomer having an amino acid skeleton in its molecule, particularly a (meth)acrylic monomer and/or oligomer. The monomer and/or oligomer having an amino acid skeleton in its molecule may be multifunctional or monofunctional. The monomer and/or oligomer having an amino acid skeleton in its molecule is preferably a mixture of a monofunctional monomer and/or oligomer having an amino acid skeleton and other multifunctional monomers and/or oligomers free of hydrophilic structure moiety, saccharide skeleton or amino acid skeleton for the same reasons as the monomer and/or oligomer having a hydrophilic structure moiety. Several kinds of amino acids can be incorporated in the membrane at the same time. The combination of these amino acids can provide the membrane with new functions (e.g., antithrombicity, selective adsorptivity of protein, optical activity).

The term "having an amino acid skeleton in its molecule" as used herein means "having an amino acid skeleton covalently bound in its molecule". Examples of such an amino acid skeleton include hydrophobic amino acids such as tryptophan, alanine, isoleucine, leucine, methionine, phenylalanine, proline and valine, derivatives thereof, hydrophilic amino acids such as arginine, asparagine, aspartic acid, cysteine, cystine, glutamic acid, glutamine, glycine, histidine, hydroxylysine, hydroxyproline, lysine and serinethreoninetyrosine, derivatives thereof, peptides and polypeptides such as glycylglycine and glycylalanylphenylalanine, and protein such as albumin.

The optimum content of the monomer and/or oligomer having an amino acid skeleton in the polymerizable solution (I) if an amino acid skeleton is incorporated therein is the same as in the monomer and/or oligomer having a hydrophilic structure moiety.

Needless to say, the foregoing monomers and/or oligomers having a hydrophilic group, saccharide skeleton and amino acid group may be used singly or in admixture. Alternatively, a monomer and/or oligomer having a plurality of these functional groups or skeletons in its molecule may be used.

The solvent (B) may be any compound so far as it can dissolve the monomer and/or oligomer (a) therein and subject a crosslinked polymer (A) obtained by the crosslinking polymerization of the monomer and/or oligomer (a) to gelation. Preferred examples of such a solvent include ketone solvents such as acetone and methyl ethyl ketone, ester solvents such as ethyl acetate, alcohol solvents such as isopropanol and butylocellosolve, amide solvents such as N,N-dimethylformamide and N,N-dimethylacetamide, aromatic hydrocarbon solvents such as toluene, chlorine solvents such as dichloromethane, N-methylpyrrolidone, dimethylsulfoxide, and various surfactants such as nonionic surface active agent, anionic surface active agent and cationic surface active agent. Needless to say, the solvent (B) may be a mixed solvent. In this case, it may contain a solvent which alone doesn't dissolve the monomer and/or oligomer (a) therein or doesn't subject the crosslinked polymer (A) to gelation. The solvent (B) may contain a solid component in the form of solution. The solid component may be, e.g., a polymer. In this case, the component to be incorporated is singly compatible with or dissolved in the coagulating solution (C) described later, e.g., water. The solvent (B) is preferably compatible with water from the standpoint of industrial productivity.

The solvent (B), if used to form an asymmetric microporous membrane, preferably exhibits a boiling point of from 80° C. to 180° C. to form a dense layer having a pore diameter falling within a desired range and raise the flux of the membrane as described later.

The polymerizable solution (I) to be used in the present invention is a mixed solution comprising the monomer and/or oligomer (a) and the solvent (B) as essential components. The polymerizable solution (I) may be almost homogeneous and may contain a small amount of immiscible moiety. The polymerizable solution (I) is preferably homogeneous. The proportion of the solvent (B) in the polymerizable solution (I) is preferably from 10% to 90% by weight, particularly from 70% to 85% by weight, because a porous material having a high void and a sufficient strength can be prepared and, if a membrane is prepared, a sufficient permeability can be obtained.

The polymerizable solution (I) may comprise other components dissolved or dispersed therein. For example, a polymerization initiator, a pore diameter adjustor such as an acid, an alkali, a salt, and a volatile or involatile solvent, a polymer, an inorganic material, etc. may be incorporated in the polymerizable solution (I) in the form of solution or dispersion.

In the preparation process of the present invention, the polymerizable solution (I) is formed into a desired shape. The method for forming the polymerizable solution (I) into a desired shape is arbitrary. For example, if a plane membrane is prepared, the polymerizable solution (I) may be casted onto a support, applied to a porous support such as nonwoven cloth or extruded through a nozzle. If a hollow fiber membrane is prepared, the polymerizable solution (I) may be extruded through a double cylinder nozzle with a liquid or gas as a core. If a bead porous material is prepared, the polymerizable solution (I) may be extruded into a gas or liquid, sprayed, dropped, or dispersed in a liquid immiscible with the components constituting the polymerizable solution (I). Needless to say, the shape into which the polymerizable solution (I) is formed may be different from the final shape. For example, the polymerizable solution (I) may be shaped into mass which is then crushed to provide a powder having the final shape.

The process for the crosslinking polymerization of the monomer and/or oligomer (a) in the polymerizable solution (I) is arbitrary. For example, the monomer and/or oligomer (a) may be subjected to crosslinking polymerization by heating, irradiation with energy ray, etc. Since the monomer and/or oligomer (a) can be polymerized at a high rate and can easily form a porous material having a vertical pore diameter distribution, it is preferably subjected to crosslinking polymerization by irradiation with energy ray.

As the energy ray there may be used electron ray, γ-ray, X-ray, ultraviolet ray, visible light, infrared ray or the like. Particularly preferred among these energy rays is ultraviolet ray from the standpoint of simplicity of apparatus and handleability. The intensity of ultraviolet ray to be used is preferably from 0.1 to 5,000 mW/cm$^2$, preferably from 10 to 1,000 mW/cm$^2$. The time of irradiation is arbitrary and is normally from about 0.1 to 100 seconds. If ultraviolet ray or visible light is used as an energy ray, the polymerizable solution (I) preferably comprise a photoinitiator incorporated therein for the purpose of raising the polymerization rate. Further, the irradiation with ultraviolet ray may be effected in an atmosphere of inert gas to raise the polymerization rate as well as the polymerization degree. Electron ray, too, is an energy ray which can be preferably used in the present invention. When electronic ray is used, the solvent, coagulating solution and other additives are not affected by absorption of ultraviolet ray. Thus, these materials can be widely selected. The use of electronic ray enhances the film forming rate. Also in the case where crosslinking polymerization is effected by heating, a polymerization initiator is preferably incorporated in the polymerizable solution (I).

When the shaped polymerizable solution (I) is subjected to crosslinking polymerization, the polymerization reaction and crosslinking reaction of the monomer and/or oligomer (a) proceed at the same time to produce a crosslinked polymer (A). The crosslinked polymer (A) is subjected to gelation by the solvent (B) simultaneously with its production. Thus, as the crosslinking polymerization proceeds, the shaped solution loses fluidity to become a gel. The polymerization and crosslinking may be effected separately. For example, the polymerizable solution (I) may be polymerized by heating, and then crosslinked by energy ray or the like.

The solvent (B) may be partly evaporated away from the shaped polymerizable solution (I) which is then subjected to crosslinking polymerization to obtain a porous material having a vertical pore diameter distribution, e.g., asymmetric porous material composed of a dense layer having a small pore diameter and a support layer having a greater pore diameter. This is important particularly when the porous material is a membrane.

In order to evaporate a part of the solvent (B) away, any method may be employed. For example, the shaped polymerizable solution (I) may be allowed to come in contact with a stream of gas such as air, nitrogen or inert gas. Alternatively, the shaped polymerizable solution (I) may be dried free from stream of gas for a predetermined period of time. Further, the shaped polymerizable solution (I) may be irradiated with infrared ray.

In accordance with the preparation process of the present invention, a thin dense layer can be formed, making it possible to raise the flux (permeation flux) for the same pore diameter. In order to form a thin dense layer, a solvent having a specified boiling point, e.g., 80° C. to 180° C. may be used as the solvent (B). Further, polymerization is preferably crosslinking polymerization by energy ray.

The reason and mechanism of the formation of a porous material having a vertical pore diameter distribution in the present invention are not made clear yet. It is presumed that the evaporation of a part of the solvent (B) leads to crosslinking polymerization with a monomer and/or oligomer concentration distribution formed, resulting in the formation of a crosslinked structure which varies vertically. The vertical pore diameter distribution (or structure constituting the distribution) is formed at the stage of phase separation in the wet process. On the other hand, the vertical pore diameter distribution is formed at the stage of gelation by crosslinking polymerization in the process for the preparation of the porous material of the present invention. This is made clear by the fact that an experiment conducted at various drying times shows that the pore diameter of the dense layer varies while the change of drying time at the step prior to the contact with the coagulating solution (C) after crosslinking polymerization shows little or no change of the pore diameter of the dense layer.

In the preparation process of the present invention, the gel formed product obtained by crosslinking polymerization is allowed to come if contact with the coagulating solution (C) which is compatible with the solvent (B) but doesn't subject the crosslinked polymer (A) to gelation, to coagulate the gel formed product and render it porous. The contacting method is arbitrary. For example, the gel formed product may be dipped in the coagulating solution (C). Alternatively, the coagulating solution (C) may be sprayed onto the gel formed product. The former method is desirable. The coagulating solution (C) has no restrictions other than the foregoing properties. For example, an alkyl ester such as methyl caprate, dialkyl ketone such as diisobutyl ketone, water, alcohol, etc. may be used. Water or an alcohol such as methanol, ethanol, propanol and butanol is desirable. Water may be in the form of solution of salt, ion, acid, alkali, organic material or inorganic material. Among these coagulating solutions, water and aqueous solution are preferred from the standpoint of industrial productivity.

The porous material obtained by coagulation is then optionally subjected to cleaning by an arbitrary method to remove the remaining solvent (B), monomer and/or oligomer (a), polymerization initiator, coagulating solution (C), etc. For cleaning, a detergent which can thoroughly dissolve the residues in the porous material but doesn't dissolve the polymer constituting the porous material may be used.

In the preparation process of the present invention, it is also preferred that a non-crosslinked polymer (D) which is soluble in the solvent (B) but is insoluble in the coagulating solution (C) is added to the polymerizable solution (I). The addition of the non-crosslinked polymer (D) gives the following advantages. (1) The polymerizable solution (I) adds to its viscosity and thus can be easily formed into a desired shape. (2) The physical and chemical properties such as fouling resistance, heat-resistance, compaction resistance and strength of the porous material can be changed. (3) The pore diameter of the porous material can be easily changed.

The foregoing advantage (1) becomes remarkable particularly with a microporous membrane having a porous material reinforced with a nonwoven cloth or a hollow fiber membrane. Referring to the foregoing advantage (2), the addition of the non-crosslinked polymer (D) possibly causes the formation of a semi IPN (semi-interpenetrating polymer network) type polymer alloy with the crosslinked polymer (A). Thus, the advantage of polymer alloy can be realized. That is, the desired physical properties can be easily realized. Physical properties which can be hardly realized with individual polymers can be realized. Referring to the foregoing advantage (3), the pore diameter is changed by the balance of the affinity of the non-crosslinked polymer (D) for the crosslinked polymer (A) (the two polymers may undergo phase separation), the solubility of the non-crosslinked polymer (D) in the solvent (B) and the affinity of the non-crosslinked polymer (D) for the coagulating solution (C). Accordingly, the selection of a proper non-crosslinked polymer (D) makes it possible to adjust the pore diameter within a wide range.

As the non-crosslinked polymer (D) there may be used any non-crosslinked polymer which is soluble in the solvent (B) but is insoluble in the coagulating solution (C). The non-crosslinked polymer (D) is preferably inert to energy ray used in the preparation process of the present invention. In other words, the non-crosslinked polymer (D) preferably doesn't substantially undergo any reaction such as polymerization, crosslinking and decomposition. In order to prepare a porous material excellent in physical properties such as strength, elongation, rigidity, heat resistance and durability, the non-crosslinked polymer (D) is preferably a polysulfone polymer such as polysulfone and polyether sulfone, amide polymer such as aliphatic polyamide, aromatic polyamide and alicyclic polyamide, cellulose polymer such as acetyl cellulose, nitrocellulose and ethyl cellulose, (meth)acrylic polymer such as polymethyl methacrylate and polyacrylonitrile, fluorine polymer such as polyvinylidene fluoride, imide polymer such as aromatic polyimide, styrene polymer, polycarbonate polymer or the like. Particularly preferred among these polymers are polysulfone, polyether sulfone, aromatic polyamide, and aromatic polyimide.

If it is desired to prepare a porous material having a great pore diameter, a fluorine-containing polymer such as polyvinylidene fluoride is preferably used as the non-crosslinked polymer. If it is desired to prepare a porous material having a high hydrophilicity, a cellulose polymer is preferably used as the non-crosslinked polymer.

If the polymerizable solution (I) comprises the non-crosslinked polymer (D) incorporated therein, the lower limit of the content of the monomer and/or oligomer (a) in the resin component (i.e., monomer, oligomer, and polymer components) contained in the polymerizable solution (I) is preferably not less than 10% by weight, more preferably not less than 15% by weight, most preferably not less than 20% by weight from the standpoint of balance of functional characteristics such as fouling resistance and strength of microporous membrane. The upper limit of the content of the monomer and/or oligomer (a) is preferably less than 90% by weight, more preferably less than 70% by weight, most preferably less than 50% by weight. The lower limit of the content of the non-crosslinked polymer (D) in the resin component contained in the polymerizable solution (I) is preferably not less than 10% by weight, more preferably not less than 30% by weight, most preferably not less than 50% by weight. The upper limit of the non-crosslinked polymer (D) is preferably less than 90% by weight, more preferably less than 85% by weight, most preferably less than 80% by weight.

In accordance with the preparation process of the present invention, a porous material wherein the diameter of pores contributing to the separation of substances is from 0.0005 to 20 $\mu$m can be prepared. Among the porous materials obtained by the preparation process of the present invention, those having a pore diameter of not more than about 0.01 $\mu$m normally are capable of cutting off molecular weight. In other words, high molecular substances, low-molecular substances or ions dissolved in the liquid can be separated from the liquid. Therefore, if the porous material is a microporous membrane, it is adapted for ultrafiltration membrane, reverse osmosis membrane or the like. If the porous material is a microporous membrane, the fact that the diameter of pores contributing to the separation of substances is not less than 0.0005 $\mu$m can be judged by the phenomenon that a liquid such as water and ethanol permeates through the microporous membrane as it is. On the other hand, the fact that the diameter of pores is not more than about 0.01 $\mu$m can be judged by a filtration test on a substance having a definite particle diameter such as protein. Among the porous materials obtained by the preparation process of the present invention, those having a pore diameter of not less than about 0.01 $\mu$m normally are not capable of cutting off molecular weight. In other words, high molecular substances, low molecular substances or ions dissolved in the liquid can be separated from the liquid. Therefore, if the porous material is a microporous membrane, it is adapted for microfiltration membrane. Those having a pore diameter within this range can be judged by a filtration test on a substance having a definite particle diameter such as bacteria or by observation under electron microscope.

In the preparation process of the present invention, if a porous material having a small pore diameter, e.g., a cut-off molecular weight of not more than 10,000 is prepared, the preparation is preferably effected with a reduced content of the non-crosslinked polymer (D) or free from the non-crosslinked polymer (D). If a porous material having a relatively great range of pore diameter is prepared, the preparation is preferably effected with some content of the non-crosslinked polymer (D). In particular, if a porous material having a pore diameter of not less than 0.1 $\mu$m is prepared, a non-crosslinked polymer (D) and a monomer and/or oligomer (a) which have a relatively poor compatibility with each other are preferably combined. The degree of compatibility can be judged by the solubility parameter calculated by the molecular structure. The closer the solubility parameter of the two components are to each other, the better compatible are they with each other.

The porous material obtained by the preparation process of the present invention may have a vertical pore diameter distribution (i.e., asymmetric structure). The term "vertical pore diameter distribution" as used herein means that the diameter of pores continuously or discontinuously changes vertically. If the porous material is a membrane, this pore diameter distribution may be as follows. (1) The pore diameter may increase or decrease continuously or discontinuously from one surface of the membrane towards the other surface thereof. (2) There is a layer having pores with the smallest diameter on both surfaces of the membrane. The pore diameter may continuously or discontinuously increase from the surfaces of the membrane towards inside the membrane. (3) There is a layer having pores with the smallest diameter inside the membrane. The pore diameter may continuously or discontinuously increase from both sides of the porous layer towards both surfaces of the membrane. Particularly preferred among these structures is the structure comprising a small pore diameter layer (dense layer) only on one surface of the membrane.

If the porous material prepared by the preparation process of the present invention has an asymmetric structure, the term "diameter of pores contributing to the separation of substances" means the pore diameter in the dense layer. In particular, in order to enhance the flux of a membrane having a pore diameter of not more than 0.1 $\mu$m, the membrane is preferably an asymmetric membrane having a thin dense layer.

The pore diameter of portions other than the dense layer in the porous material having an asymmetric structure, i.e., support layer is arbitrary except that it is greater than that of the dense layer. For example, it is not more than 20 $\mu$m, preferably not more than 3 μm. A porous material having pores having a diameter of from 10 to 200 μm and a length of from 50 to 500 μm called macropore may be formed in the support layer. The porous materials obtained by the preparation process of the present invention may include such a membrane.

The shape of the porous material prepared by the preparation process of the present invention is arbitrary. It may be in the form of membrane such as plane membrane, tubular membrane (including capillary membrane), monolithic membrane (tubular membrane having a plurality of core pores) and hollow fiber membrane, fiber having a circular or irregular section, bead, powder, tablet, rod, mass or the like. The porous material of the present invention exerts the effect of the present invention particularly when it is in the form of microporous membrane. The thickness of the microporous membrane is arbitrary but is preferably from 1 to 1,000 μm, more preferably from 50 to 500 μm.

The porous material of the present invention will be further described hereinafter.

The porous material of the present invention is made of a semi IPN type polymer alloy of a crosslinked polymer (A) with a non-crosslinked polymer (D).

IPN means an interpenetrating polymer network structure. The semi IPN is IPN comprising a crosslinked polymer on one side and a non-crosslinked polymer on the other. A semi IPN type polymer alloy can be formed by subjecting a non-crosslinked polymer in the form of solution to crosslinking polymerization with a monomer and/or oligomer or by subjecting a crosslinked polymer swollen by a monomer and/or oligomer to non-crosslinking polymerization with a monomer in the presence or absence of a solvent. However, in the present invention, it is not necessary that the crosslinked polymer (A) and the non-crosslinked polymer (D) are completely compatible with each other. The two polymers may undergo phase separation. Even if the crosslinked polymer (A) and the non-crosslinked polymer (D) undergo phase separation, the crosslinked polymer (A)-rich phase and the non-crosslinked polymer (D)-rich phase each assume a semi IPN structure. However, the porous material of the present invention is not a blend of a particulate crosslinked polymer and a non-crosslinked polymer (D). This can be confirmed by the fact that when the porous material of the present invention is dipped in a solvent capable of dissolving non-crosslinked polymer, a large portion of the crosslinked polymer is not dispersed in particulate form.

The porous material having the foregoing semi IPN structure can exhibit enhancement in physical properties such as strength, hardness and heat resistance. At the same time, the porous material can exhibit enhancement in chemical and biological properties such as non-adsorptivity and selective adsorptivity of protein. For example, in order to obtain a fouling-resistant microporous membrane, as the crosslinked polymer (A) there may be preferably used a polymer having a hydrophilic structure moiety. As the non-crosslinked polymer there may be preferably used a polymer free of hydrophilic group excellent in physical properties.

The process for the preparation of the porous material of the present invention is not specifically limited. The foregoing preparation process of the present invention is preferably used. For example, a process may be employed which comprises shaping a polymerizable solution comprising as essential components a monomer and/or oligomer (a), a solvent (B) and a non-crosslinked polymer (D), subjecting the shaped polymerizable solution to crosslinking polymerization to form a gel formed product made of a semi IPN type polymer alloy, and then allowing the gel formed product to come in contact with a coagulating solution (C) so that it is coagulated and rendered porous.

The crosslinked polymer (A) as the crosslinked polymer of the monomer and/or oligomer (a) may be the same as described with reference to the preparation process of the present invention. In particular, it is preferably a (meth) acrylic crosslinked polymer to provide the resulting porous material with excellent hydrophilicity, heat resistance, strength and durability. If it is desired to provide the porous material with hydrophilicity, the crosslinked polymer (A) is preferably a (meth)acrylic crosslinked polymer having a hydrophilic structure moiety. The term "having a hydrophilic structure moiety" as used herein means "having a hydrophilic group in molecule." Examples of the hydrophilic group include nonionic hydrophilic groups such as polyethylene glycol chain, polyoxymethylene chain, hydroxyl group, and amide group, anionic hydrophilic groups such as carboxyl group, sulfonic group, phosphoric acid group and phosphorous acid group, cationic hydrophilic groups such as amino group, and ammonium group, and ampho-ion groups such as amino acid-containing group and ammonium/phosphoric acid-containing group. These hydrophilic groups may be contained in main chain or side chain. The porous material, if it is a microporous membrane, preferably exhibits a contact angle with water of not less than 5 degrees, preferably not less than 10 degrees, less than ever due to the incorporation of a hydrophilic structure moiety to provide enhancement in fouling resistance.

If it is desired to prepare a microporous membrane having a low protein adsorptivity or bio-compatibility, the monomer and/or oligomer (a) preferably contains a (meth)acrylic monomer and/or oligomer having a saccharide skeleton in its molecule. The incorporation of other functional groups (e.g., sulfonic acid group) in the saccharide skeleton to be incorporated in the membrane can provide the membrane with new functions (e.g., antithrombicity, selective adsorptivity of protein, optical activity). The term "having a saccharide skeleton in its molecule" as used herein means "having a saccharide skeleton covalently bound in its molecule". Examples of such a saccharide skeleton include monosaccharides such as glucose, galactose and mannose, derivatives thereof (e.g., methyl glucoside), disaccharides such as maltose, cellobiose, lactose and sucrose, derivatives thereof, oligosaccharide such as cyclodextrin, derivatives thereof, and polysaccharide such as starch.

If it is desired to prepare a porous material having a bio-compatibility, high protein adsorptivity or selective adsorptivity of protein, the monomer and/or oligomer (a) preferably contains a (meth)acrylic monomer and/or oligomer having an amino acid skeleton in its molecule. The membrane can comprise several kinds of amino acids incorporated therein at the same time. The combination of these amino acids can provide the membrane with new functions (e.g., antithrombicity, selective adsorptivity of protein, optical activity). The term "having an amino acid skeleton in its molecule" as used herein means "having an amino acid skeleton covalently bound in its molecule". Examples of such an amino acid skeleton include hydrophobic amino acids such as tryptophan, alanine, isoleucine, leucine, methionine, phenylalanine, proline and valine, derivatives thereof, hydrophilic amino acids such as arginine, asparagine, aspartic acid, cysteine, cystine, glutamic acid, glutamine, glycine, histidine, hydroxylysine, hydroxyproline, lysine and serinethreoninetyrosine, derivatives thereof, peptides and polypeptides such as glycylglycine and glycylalanylphenylalanine, and protein such as albumin.

Needless to say, the foregoing monomers and/or oligomers having a hydrophilic group, saccharide skeleton and amino acid group may be used singly or in admixture.

The non-crosslinked polymer (D) may be the same as described with reference to the preparation process of the present invention. The lower limit of the content of the non-crosslinked polymer (D) in the resin component (polymer component) in the porous material of the present invention is preferably not less than 10% by weight, more preferably not less than 30% by weight, most preferably not less than 50% by weight, because the effect of the non-crosslinked polymer (D) can be definitely recognized. The upper limit of the content of the non-crosslinked polymer (D) is preferably less than 90% by weight, more preferably less than 85% by weight, most preferably less than 80% by weight, because the effect based on the semi IPN structure of the crosslinked polymer (A) and the non-crosslinked polymer (D) can be sufficiently exerted.

The porous material of the present invention may contain components other than the crosslinked polymer (A) and the non-crosslinked polymer (D), such as colorant, ultraviolet absorbent, anticoagulant (e.g., heparin) and inorganic material.

The structure and pore diameter of the porous material of the present invention may be the same as described with reference to the porous material prepared by the preparation process of the present invention. The porous material of the present invention is preferably a microporous membrane, particularly an asymmetric membrane, more particularly an asymmetric membrane having a cut-off molecular weight of from 1,000 to 300,000, because it can exert its effects. The membrane is preferably in the form of plane membrane, hollow fiber membrane or tubular membrane.

EXAMPLES

The present invention will be further described in the following examples and comparative examples, but the present invention should not be construed as being limited thereto. The "parts" as used hereinafter are "parts by weight".

Example 1
(Preparation of Polymerizable Solution (I-1))

67.5 parts of a urethane acrylate oligomer having three acrylic groups per molecule on the average ["UNIDIC V-4263", available from Dainippon Ink and Chemicals, Inc.] as a monomer and/or oligomer (a), 22.5 parts of a dicyclopentanyl diacrylate ["KAYARAD R-684", available from Nippon Kayaku Co., Ltd.], 10 parts of methoxynonaethylene glycol acrylate ["NK ESTER AM-90G", available from Shin-nakamura Chemical Industrial Co., Ltd.], and a mixture of 300 parts of N,N-dimethylacetamide (DMAC) and 100 parts of a polyvinyl pyrrolidone (molecular weight: 10,000) as a solvent (B), and 2 parts of "IRGACURE 184" (available from Ciba Geigy Inc.) as a photoinitiator were mixed to obtain a polymerizable solution (I-1).
(Preparation of Porous Material 1)

The polymerizable solution (I-1) was applied to a glass plate by means of a film applicator to a thickness of 200 μm. The coated material was then allowed to stand in a stream of nitrogen for 2 minutes to cause a part of the solvent (B) to evaporate away. The coated material was then irradiated with ultraviolet ray having an intensity of 100 mW/cm² at 360 nm from a metal halide lamp for 40 seconds. The transparent gel coat film obtained by irradiation with ultraviolet ray which had lost fluidity was then dipped in tap water as a coagulating solution (C) together with the glass plate. As a result, the coat film became semiopaque and was coagulated. The membrane thus obtained was peeled off the glass plate, dipped in ethanol for 12 hours, and then dipped in flowing water for 4 hours so that it was washed to obtain a porous material 1 in the form of membrane (hereinafter simply referred to as "membrane 1"). The membrane 1 thus obtained was partly stored in distilled water before filtration test. Another part of the membrane 1 was dried at 40° C. in vacuo before observation for pore diameter and measurement for contact angle.
(Evaluation of Properties of Membrane)

The membrane 1 dried in vacuo had gloss on the side thereof which had come in contact with nitrogen stream and no gloss on the side thereof which had come in contact with the glass plate. Further, the membrane 1 was observed under scanning electron microscope (SEM). As a result, the membrane 1 showed pores having a diameter of about 0.5 μm on the side thereof which had come in contact with the glass plate and no pores on the side thereof which had come in contact with nitrogen stream. Further, the section of the membrane 1 was observed. As a result, a portion having a small pore diameter was found only on the surface layer which had come in contact with nitrogen stream. The thickness of the portion having a small pore diameter was not more than 1 μm. There was recognized no so-called macropores having a diameter of not less than 10 μm on the section of the membrane 1.

Using a Type CA-D contact angle meter available from Kyowa Interface Science Corporation Limited, the membrane 1 was measured for contact angle with water on the side thereof which had come in contact with nitrogen stream. The results were 54 degrees.

Using the membrane 1, water (distilled water) flux was measured and a 0.5 wt-% aqueous solution (pH 7.0 buffering solution) of bovine serum albumin (molecular weight: 67,000) was subjected to filtration test through an ultrafiltration tester SM-165-26 available from Sartorius K.K. The filtration pressure at which water flux was measured was 2 kg/cm². The filtration pressure at which rejection was measured was 0.5 kg/cm². The filtration temperature was 25° C. for both measurements. The measurement was made 5 minutes after the beginning of filtration. The water flux and the rejection of bovine serum albumin (BSA) are set forth in Table 1.

Using the membrane 1, bovine serum albumin (BSA) was subjected to adsorption test. In some detail, 1 g of the membrane 1 was dipped in 100 ml of a 0.5 g/l aqueous solution of BSA (pH 7.0 buffering solution) for 24 hours. The change of BSA concentration between before and after dipping was optically measured to determine the amount of BSA adsorbed by the membrane 1 (BSA adsorption). The results are set forth in the column of BSA adsorption in the adsorption test in Table 1.

Example 2
(Preparation of Polymerizable Solution (I-2))

2 parts of a diethylene oxide-modified bisphenol A diacrylate ("NEWFRONTIER BPE-4", available from Dai-ichi Kogyo Seiyaku Co., Ltd.] as a monomer and/or oligomer (a), 5 parts of a methoxynonaethylene glycol acrylate ["NK ESTER AM-90G", available from Shin-nakamura Chemical Industrial Co., Ltd.], 85 parts of N,N-dimethylacetamide (DMAC) as a solvent (B), 18 parts of an aromatic polyamide ["CONEX", available from Teijin Ltd.] as a non-crosslinked polymer (D), and 2 parts of "IRGACURE 184" (available from Ciba Geigy Inc.) as a photoinitiator were mixed to obtain a polymerizable solution (I-2).

(Preparation of Porous Material 2)

The procedure of Example 1 was followed except that the polymerizable solution (I-2) was used instead of the polymerizable solution (I-1). As a result, a porous material 2 which had gloss on the side thereof which had come in contact with nitrogen stream and no gloss on the side thereof which had come in contact with the glass plate was obtained in the form of membrane (hereinafter simply referred to as "membrane 2"). The membrane 2 thus obtained was partly stored in distilled water before filtration test and adsorption test. Another part of the membrane 2 was dried at 40° C. in vacuo before observation for pore diameter and measurement for contact angle.

(Evaluation of Properties of Membrane)

The membrane 2 dried in vacuo had the same structure as in Example 1 except that it had a pore diameter of about 1 μm on the side thereof which had come in contact with the glass plate and there was a so-called macropore having a pore diameter of from 10 to 50 μm. The membrane 2 showed a contact angle of 48 degrees with water on the side thereof which had come in contact with nitrogen stream.

Using the membrane 2, the water flux and the rejection of BSA were measured in the same manner as in Example 1. The results are set forth in Table 1. Further, the membrane 2 was subjected to heat treatment in 80° C. hot water for 30 minutes, and then measured for water flux. The results are set forth in Table 1. The results set forth in Table 1 show that heat treatment causes little or no drop of flux. On the other hand, the water flux of the membrane 2 which had been used for filtration for 2 hours is set forth in Table 1. The results set forth in Table 1 show that the compaction causes little or no drop of flux.

Using the membrane 2, bovine serum albumin (BSA) was subjected to adsorption test. In some detail, 1 g of the membrane 2 was dipped in 100 ml of a 0.5 g/l aqueous solution of BSA (pH 7.0 buffering solution) for 24 hours. The change of BSA concentration between before and after dipping was optically measured to determine the amount of BSA adsorbed by the membrane 2 (BSA adsorption). The results are set forth in the column of BSA adsorption in the adsorption test in Table 1.

Example 3

(Preparation of Polymerizable Solution (I-3))

4.5 parts of tetraethylene glycol diacrylate [NK ESTER A-200, available from Shin-nakamura Chemical Industrial Co., Ltd.] as a monomer and/or oligomer (a), 2.5 parts of N,N-dimethylacrylamide [available from Kohjin Co., Ltd.], 67 parts of N,N-dimethylacetamide (DMAC) as a solvent (B), 18 parts of UDEL Polysulfon P1700 [available from Amoco Performance Products Inc.] as a non-crosslinked polymer (D) and 2 parts of IRGACURE 184 (available from Ciba Geigy Inc.) as a photoinitiator were mixed to obtain a polymerizable solution (I-3).

(Preparation of Porous Material 3)

The procedure of Example 1 was followed except that the polymerizable solution (I-3) was used instead of the polymerizable solution (I-1). As a result, a porous material 3 which had gloss on the side thereof which had come in contact with nitrogen stream and no gloss on the side thereof which had come in contact with the glass plate was obtained in the form of membrane (hereinafter simply referred to as "membrane 3"). The membrane 3 thus obtained was partly stored in distilled water before filtration test and adsorption test. Another part of the membrane 1 was dried at 40° C. in vacuo before observation for pore diameter and measurement for contact angle.

(Evaluation of Properties of Membrane)

The membrane 3 thus obtained had the same structure as membrane 2 in Example 2. The membrane 3 showed a contact angle of 47 degrees with water on the side thereof which had come in contact with nitrogen stream.

Using the membrane 3, the water flux and the rejection of BSA were measured in the same manner as in Example 1. The results are set forth in Table 1. Further, the membrane 3 was subjected to heat treatment in 80° C. hot water for 30 minutes, and then measured for water flux. The results are set forth in Table 1. On the other hand, the water flux of the membrane 3 which had been used for filtration for 2 hours is set forth in Table 1. The results set forth in Table 1 show that the compaction causes a slight drop of flux and the heat treatment causes a small drop of flux.

The adsorption of bovine serum albumin (BSA) was measured in the same manner as in Example 2 except that the membrane 3 was used. The results are set forth in the column of BSA adsorption in the adsorption test in Table 1.

Example 4

(Preparation of Polymerizable Solution (I-4))

A polymerization solution (I-4) was obtained in the same manner as in Example 3 except that 18 parts of a polyether sulfon ("RADEL 500NT", available from Amoco Performance Products Inc.) were used as a non-crosslinked polymer (D), 102 parts of N,N-dimethylacetamide (DMAC) were used as a solvent and 5.4 parts of lithium chloride were further added to the system.

(Preparation of Porous Material 4)

The procedure of Example 1 was followed except that the polymerizable solution (I-4) was used instead of the polymerizable solution (I-1). As a result, a porous material 4 which had gloss on the side thereof which had come in contact with nitrogen stream and no gloss on the side thereof which had come in contact with the glass plate was obtained in the form of membrane (hereinafter simply referred to as "membrane 4"). The membrane 4 thus obtained was partly stored in distilled water before filtration test and adsorption test. Another part of the membrane 4 was dried at 40° C. in vacuo before observation for pore diameter and measurement for contact angle.

(Evaluation of Properties of Membrane)

The membrane 4 thus obtained had the same structure as membrane 2 in Example 2. The membrane 4 showed a contact angle of 49 degrees with water on the side thereof which had come in contact with nitrogen stream.

Using the membrane 4, the water flux and the rejection of BSA were measured in the same manner as in Example 1. The results are set forth in Table 1. Further, the membrane 4 was subjected to heat treatment in 80° C. hot water for 30 minutes, and then measured for water flux. The results are set forth in Table 1.

The adsorption of bovine serum albumin (BSA) was measured in the same manner as in Example 2 except that the membrane 4 was used. The results are set forth in the column of BSA adsorption in the adsorption test in Table 1.

Example 5

(Preparation of Polymerizable Solution (I-5))

2.0 parts of a caprolactone-modified tris(acryloyl-t-oxyethyl)isocyanate ["ARONIX M-325", available from Toagosei Co., Ltd.] as a monomer and/or oligomer (a), 1.1 parts of sodium sulfonate ethoxy methacrylate ["Antox-MS-2N", available from Nippon Nyukazai Co., Ltd.], 90 parts of N,N-dimethylacetamide (DMAC) as a solvent (B), 18 parts of cellulose acetate [available from Kanto Chemical Co., Ltd.] as a non-crosslinked polymer (D), and 2 parts of IRGACURE 184 (available from Ciba Geigy Inc.) as a photoinitiator were mixed to obtain a polymerizable solution (I-5).

(Preparation of Porous Material 5)

The procedure of Example 1 was followed except that the polymerizable solution (I-5) was used instead of the polymerizable solution (I-1). As a result, a porous material 5 which had gloss on the side thereof which had come in contact with nitrogen stream and no gloss on the side thereof which had come in contact with the glass plate was obtained in the form of membrane (hereinafter simply referred to as "membrane 5"). The membrane 5 thus obtained was partly stored in distilled water before filtration test and adsorption test. Another part of the membrane 5 was dried at 40° C. in vacuo before observation for pore diameter and measurement for contact angle.

(Evaluation of Properties of Membrane)

The membrane 5 thus obtained had the same structure as membrane 2 in Example 2 except that it had a pore diameter of about 0.5 μm on the side thereof which had come in contact with nitrogen stream. The membrane 5 showed a contact angle of 46 degrees with water on the side thereof which had come in contact with nitrogen stream.

Using the membrane 5, the water flux and the rejection of BSA were measured in the same manner as in Example 1. The results are set forth in Table 1. Further, the membrane 5 was subjected to heat treatment in 80° C. hot water for 30 minutes, and then measured for water flux. The results are set forth in Table 1.

The adsorption of bovine serum albumin (BSA) was measured in the same manner as in Example 2 except that the membrane 5 was used. The results are set forth in the column of BSA adsorption in the adsorption test in Table 1.

Example 6

(Preparation of Polymerizable Solution (I-6))

2 parts of diethylene oxide-modified bisphenol A diacrylate [NEWFRONTIER BPE-4, available from Dai-ichi Kogyo Seiyaku Co., Ltd.] as a monomer and/or oligomer (a), 5 parts of mono(2-acryloyloxyethyl) acid phosphate ["LIGHTESTER PA", available from Kyoeisha Chemicals Co., Ltd.], 87 parts of N,N-dimethylacetamide (DMAC) as a solvent (B), 18 parts of a polyether imide ["ULTEM 10000", available from GE Plastics Japan] as a non-crosslinked polymer (D), and 2 parts of "IRGACURE 184" (available from Ciba Geigy Inc.) as a photoinitiator were mixed to obtain a polymerizable solution (Preparation of Porous Material 6)

The procedure of Example 1 was followed except that the polymerizable solution (I-6) was used instead of the polymerizable solution (I-1). As a result, a porous material 6 which had gloss on the side thereof which had come in contact with nitrogen stream and no gloss on the side thereof which had come in contact with the glass plate was obtained in the form of membrane (hereinafter simply referred to as "membrane 6"). The membrane 6 thus obtained was partly stored in distilled water before filtration test and adsorption test. Another part of the membrane 6 was dried at 40° C. in vacuo before observation for pore diameter and measurement for contact angle.

(Evaluation of Properties of Membrane)

The membrane 6 thus obtained had the same structure as membrane 2 in Example 2. The membrane 6 showed a contact angle of 48 degrees with water on the side thereof which had come in contact with nitrogen stream.

Using the membrane 6, the water flux and the rejection of BSA were measured in the same manner as in Example 1. The results are set forth in Table 1. Further, the membrane 6 was subjected to heat treatment in 80° C. hot water for 30 minutes, and then measured for water flux. The results are set forth in Table 1. On the other hand, the water flux of the membrane 6 which had been used for filtration for 2 hours is set forth in Table 1. The results set forth in Table 1 show that the compaction causes little or no drop of flux and the heat treatment causes no drop of flux.

The adsorption of bovine serum albumin (BSA) was measured in the same manner as in Example 2 except that the membrane 6 was used. The results are set forth in the column of BSA adsorption in the adsorption test in Table 1.

Example 7

(Preparation of Polymerizable Solution (I-7))

4.5 parts of trimethylolpropane triacrylate ["NEWFRONTIER TMPT", available from Dai-ichi Kogyo Seiyaku Co., Ltd.] as a monomer and/or oligomer (a), 1.5 parts of a quaterized dimethylaminoethyl methacrylate ["LIGHTESTER DQ-75", available from Kyoeisha Chemicals Co., Ltd.], 85 parts of N,N-dimethylacetamide (DMAC) as a solvent (B), 18 parts of a polystyrene ["DICSTYRENE XC-520", available from Dainippon Ink and Chemicals, Inc.] as a non-crosslinked polymer (D), and 2 parts of IRGACURE 184 (available from Ciba Geigy Inc.) as a photoinitiator were mixed to obtain a polymerizable solution (I-7).

(Preparation of Porous Material 7)

The procedure of Example 1 was followed except that the polymerizable solution (I-7) was used instead of the polymerizable solution (I-1). As a result, a porous material 7 which had gloss on the side thereof which had come in contact with nitrogen stream and no gloss on the side thereof which had come in contact with the glass plate was obtained in the form of membrane (hereinafter simply referred to as "membrane 7"). The membrane 7 thus obtained was partly stored in distilled water before filtration test and adsorption test. Another part of the membrane 7 was dried at 40° C. in vacuo before observation for pore diameter and measurement for contact angle.

(Evaluation of Properties of Membrane)

The membrane 7 thus obtained had the same structure as the membrane 2 in Example 2. The membrane 7 showed a contact angle of 72 degrees with water on the side thereof which had come in contact with nitrogen stream.

Using the membrane 7, the water flux and the rejection of BSA were measured in the same manner as in Example 1. The results are set forth in Table 1. Further, the membrane 7 was subjected to heat treatment in 80° C. hot water for 30 minutes, and then measured for water flux. The results are set forth in Table 1.

The adsorption of bovine serum albumin (BSA) was measured in the same manner as in Example 2 except that the membrane 7 was used. The results are set forth in the column of BSA adsorption in the adsorption test in Table 1.

Example 8

(Preparation of Polymerizable Solution (I-8))

4.5 parts of trimethylolpropane triacrylate ["NEWFRONTIER TMPT", available from Dai-ichi Kogyo Seiyaku Co., Ltd.] as a monomer and/or oligomer (a), 1.5 parts of a quaterized dimethylaminoethyl methacrylate ["LIGHTESTER DQ-75", available from Kyoeisha Chemicals Co., Ltd.], 85 parts of N,N-dimethylacetamide (DMAC) as a solvent (B), 18 parts of a polystyrene ["DICSTYRENE XC-520", available from Dainippon Ink and Chemicals, Inc.] as a non-crosslinked polymer (D), and 2 parts of IRGACURE 184 (available from Ciba Geigy Inc.) as a photoinitiator were mixed to obtain a polymerizable solution (I-8).

21

(Preparation of Porous Material 8)

The polymerizable solution (I-8) was extruded through a double cylinder nozzle with water as a core, and then allowed to run in a stream of nitrogen over about 10 cm. The material thus extruded was irradiated with ultraviolet ray from a 3 kw metal halide lamp at the point of 30 to 60 cm below the nozzle, and then continuously dipped in water the surface of which was disposed 65 cm below the nozzle. The material was then withdrawn from water to obtain a porous material 8 in the form of hollow fiber membrane having a diameter of 0.88 mm and a thickness of 0.16 mm (hereinafter referred to as "membrane 8"). The membrane 8 was air-dried. A part of the membrane 8 was then subjected to measurement for pore diameter. The rest part of the membrane 8 was mounted in an ultrafiltration type filter module having an effective membrane area of about 0.2 m$^2$ for filtration test.

(Evaluation of Properties of Membrane)

The membrane 8 showed no pores on the external surface thereof. The membrane 8 had a pore diameter of about 0.3 $\mu$m on the internal surface thereof. The membrane 8 was also observed to have so-called macropores having a pore diameter of from 10 to 50 $\mu$m on the section thereof.

The water flux and BSA rejection were measured in the same manner as in Example 1 except that the ultrafiltration type filter module having the membrane 8 mounted thereon was used. The results are set forth in Table 1.

Example 9
(Preparation of Polymerizable Solution (I-9))

2 parts of diethylene oxide-modified bisphenol A diacrylate [NEWFRONTIER BPE-4, available from Dai-ichi Kogyo Seiyaku Co., Ltd.] as a monomer and/or oligomer (a), 8.6 parts of N-methacryloyloxyethylcarbamic acid tryptophan as a monomer having an amino acid skeleton synthesized from 2-isocyanate ethyl methacrylate and L-tryptophan (L-Trp), 85 parts of N,N-dimethylacetamide (DMAC) as a solvent (B), 18 parts of an aromatic polyamide ["CONEX", available from Teijin Limited] as a non-crosslinked polymer (D), and 2 parts of IRGACURE 184 (available from Ciba Geigy Inc.) as a photoinitiator were mixed to obtain a polymerizable solution (I-9).

(Preparation of Porous Material 9).

The procedure of Example 1 was followed except that the polymerizable solution (I-9) was used instead of the polymerizable solution (I-1). As a result, a porous material 9 which had gloss on the side thereof which had come in contact with nitrogen stream and no gloss on the side thereof which had come in contact with the glass plate was obtained in the form of membrane (hereinafter simply referred to as "membrane 9"). The membrane 9 thus obtained was partly stored in distilled water before filtration test and adsorption test. Another part of the membrane 9 was dried at 40° C. in vacuo before observation for pore diameter and measurement for contact angle.

(Evaluation of Properties of Membrane)

The membrane 9 dried in vacuo had the same structure as in Example 1 except that it had a pore diameter of about 1 $\mu$m on the side thereof which had come in contact with the glass plate and there was a so-called macropore having a pore diameter of from 10 to 50 $\mu$m. The membrane 9 showed a contact angle of 68 degrees with water on the side thereof which had come in contact with nitrogen stream.

Using the membrane 9, the water flux and the rejection of BSA were measured in the same manner as in Example 1. The results are set forth in Table 1. Further, the membrane 9 was subjected to heat treatment in 10° C. hot water for 30 minutes, and then measured for water flux. The results are

22 set forth in Table 1. The results set forth in Table 1 show that heat treatment causes little or no drop of flux.

The adsorption of bovine serum albumin (BSA) was measured in the same manner as in Example 2 except that the membrane 9 was used. The results are set forth in the column of BSA adsorption in the adsorption test in Table 1.

The adsorption of $\gamma$-globulin was measured in the same manner as above. The results were 0.0. In other words, it can be seen that the membrane 9, which comprised tryptophan incorporated therein, has selective adsorptivity with respect to BSA as compared with Comparative Example 1.

Example 10
[Preparation of Polymerizable Solution (I-10))

2 parts of diethylene oxide-modified bisphenol A diacrylate [NEWFRONTIER BPE-4, available from Dai-ichi Kogyo Seiyaku Co., Ltd.] as a monomer and/or oligomer (a), 5 parts of 6-acryloyl(1-o-)n-butylglucoside as a monomer having a saccharide skeleton, 90 parts of N,N-dimethylacetamide (DMAC) as a solvent (B), 18 parts of an aromatic polyamide ["CONEX", available from Teijin Limited] as a non-crosslinked polymer (D), and 2 parts of IRGACURE 184 (available from Ciba Geigy Inc.) as a photoinitiator were mixed to obtain a polymerizable solution (I-10).

(Preparation of Porous Material 10)

The procedure of Example 1 was followed except that the polymerizable solution (I-10) was used instead of the polymerizable solution (I-1). As a result, a porous material 10 which had gloss on the side thereof which had come in contact with nitrogen stream and no gloss on the side thereof which had come in contact with the glass plate was obtained in the form of membrane (hereinafter simply referred to as "membrane 10"). The membrane 10 thus obtained was partly stored in distilled water before filtration test and adsorption test. Another part of the membrane 10 was dried at 40° C. in vacuo before observation for pore diameter and measurement for contact angle.

(Evaluation of Properties of Membrane)

The membrane 10 dried in vacuo had the same structure as in Example 1 except that it had a pore diameter of about 1 $\mu$m on the side thereof which had come in contact with the glass plate and there was a so-called macropore having a pore diameter of from 10 to 50 $\mu$m. The membrane 10 showed a contact angle of 42 degrees with water on the side thereof which had come in contact with nitrogen stream.

Using the membrane 10, the water flux and the rejection of BSA were measured in the same manner as in Example 1. The results are set forth in Table 1. Further, the membrane 10 was subjected to heat treatment in 80° C. hot water for 30 minutes, and then measured for water flux. The results are set forth in Table 1. The results set forth in Table 1 show that heat treatment. causes little or no drop of flux.

The adsorption of bovine serum albumin (BSA) was measured in the same manner as in Example 2 except that the membrane 10 was used. The results are set forth in the column of BSA adsorption in the adsorption test in Table 1.

It can be seen that the membrane 10, which comprised a saccharide skeleton incorporated therein, has an even lower BSA adsorption than the membrane having a polyethylene glycol group incorporated therein in Example 2.

Comparative Example 1

Comparative Example 1 shows an example of an aromatic polyamide microporous membrane prepared by the conventional dry-wet method.

(Preparation of Porous Material)

A solution obtained by dissolving 18 parts of an aromatic polyamide ["CONEX", available from Teijin Limited] in 85 parts of N,N-dimethylacetamide (DMAC) was applied to a glass plate by means of a film applicator to a thickness of 200 µm. The coated material was then allowed to stand in a stream of nitrogen for 2 minutes to cause a part of DMAC to evaporate away. The coated material was then dipped in tap water together with the glass plate. As a result, the coat film became semiopaque and was coagulated. The membrane thus obtained was peeled off the glass plate, dipped in ethanol for 12 hours, and then dipped in flowing water for 4 hours so that it was washed to obtain an asymmetric microporous membrane 1' (hereinafter simply referred to as "membrane 1'"). The membrane 1' thus obtained was partly stored in distilled water before filtration test and adsorption test. Another part of the membrane 1' was dried at 40° C. in vacuo before observation for pore diameter and measurement for contact angle.

(Evaluation of Properties of Membrane)

The membrane 1' dried in vacuo had gloss on the side thereof which had come in contact with nitrogen stream and no gloss on the side thereof which had come in contact with the glass plate. Further, the membrane 1' was observed under scanning electron microscope (SEM). As a result, the membrane 1 showed pores having a diameter of about 0.3 µm on the side thereof which had come in contact with the glass plate and pores having a diameter of about 0.02 µm on the side thereof which had come in contact with nitrogen stream. Further, the section of the membrane 1 was observed. As a result, a portion having a small pore diameter was found only on the surface layer which had come in contact with nitrogen stream. The thickness of the portion having a small pore diameter was not more than 1 µm. There was recognized so-called macropores having a diameter of from 10 to 100 µm on the section of the membrane 1'. The membrane 1' showed a contact angle of 72 degrees with water on the side thereof which had come in contact with nitrogen stream.

Using the membrane 1', the water flux and BSA rejection were measured in the same manner as in Example 1. The results are set forth in Table 2. The membrane 1' was subjected to heat treatment in 80° C. hot water for 30 minutes, and then measured for water flux. The membrane 1' was used for filtration for 2 hours, and then measured for water flux. The results are set forth in Table 2.

The adsorption of bovine serum albumin (BSA) was measured in the same manner as in Example 2 except that the membrane 1' was used. The results are set forth in the column of BSA adsorption in the adsorption test in Table 2. The adsorption of γ-globulin was measured in the same manner as above. The results were 17.6 mg/g.

These results show that the membrane 1' has a low hydrophilicity, a great protein adsorption and poor heat resistance and compaction resistance.

Comparative Example 2

Comparative Example 2 shows an example of a polysulfon microporous membrane prepared by the conventional dry-wet method.

(Preparation of Porous Material)

A porous material 2' (hereinafter simply referred to as "membrane 2'") was obtained in the same manner as in Comparative Example 1 except that a solution obtained by dissolving 18 parts of a polysulfon ("UDEL POLYSULFON P1700", available from Amoco Performance Products Inc.) in 85 parts of N,N-dimethylacetamide (DMAC) was used.

The membrane 2' was observed under scanning electron microscope (SEM). As a result, the membrane 2' showed pores having a diameter of about 0.3 µm on the side thereof which had come in contact with the glass plate and pores having a diameter of about 0.02 µm on the side thereof which had come in contact with nitrogen stream. Further, the section of the membrane 2' was observed. As a result, a portion having a small pore diameter was found only on the surface layer which had come in contact with nitrogen stream. The thickness of the portion having a small pore diameter was not more than 1 µm. There was recognized so-called macropores having a diameter of from 10 to 100 µm on the section of the membrane 2'. The membrane 2' showed a contact angle of 69 degrees with water on the side thereof which had come in contact with nitrogen stream.

Using the membrane 2', the water flux and BSA rejection were measured in the same manner as in Example 1. The results are set forth in Table 2. The membrane 2' was subjected to heat treatment in 80° C. hot water for 30 minutes, and then measured for water flux. The membrane 2' was used for filtration for 2 hours, and then measured for water flux. The results are set forth in Table 2.

The adsorption of bovine serum albumin (BSA) was measured in the same manner as in Example 2 except that the membrane 2' was used. The results are set forth in the column of BSA adsorption in the adsorption test in Table 2.

These results show that the membrane 2' has a low hydrophilicity, a great protein adsorption and poor heat resistance and compaction resistance.

Comparative Example 3

Comparative Example 3 shows an example of a polystyrene microporous membrane prepared by the conventional dry-wet method.

(Preparation of Porous Material)

A porous material 3' ("membrane 3'") was obtained in the same manner as in Comparative Example 1 except that a solution obtained by dissolving 18 parts of a polystyrene ("DIC STYRENE XC-520" available from Dainippon Ink and Chemicals, Inc.) in 85 parts of N,N-dimethylacetamide (DMAC) was used instead of the solution of an aromatic polyamide in N,N-dimethylacetamide (DMAC).

(Evaluation of Properties of Membrane)

The membrane 3' was observed under scanning electron microscope (SEM). As a result, the membrane 3' showed pores having a diameter of about 0.3 µm on the side thereof which had come in contact with the glass plate and pores having a diameter of about 0.02 µm on the side thereof which had come in contact with nitrogen stream. Further, the section of the membrane 3' was observed. As a result, a portion having a small pore diameter was found only on the surface layer which had come in contact with nitrogen stream. The thickness of the portion having a small pore diameter was not more than 1 µm. There was recognized so-called macropores having a diameter of from 10 to 100 µm on the section of the membrane 3'. The membrane 3' showed a contact angle of 80 degrees with water on the side thereof which had come in contact with nitrogen stream.

Using the membrane 3', the water flux and BSA rejection were measured in the same manner as in Example 1. The results are set forth in Table 2. The membrane 3' was subjected to heat treatment in 80° C. hot water for 30 minutes, and then measured for water flux. The membrane 3' was used for filtration for 2 hours, and then measured for water flux. The results are set forth in Table 2. When subjected to heat treatment in 80° C. hot water for 30 minutes, the membrane 3' showed a drastic shrinkage and a remarkable flux drop.

The adsorption of bovine serum albumin (BSA) was measured in the same manner as in Example 2 except that the membrane 3' was used. The results are set forth in the column of BSA adsorption in the adsorption test in Table 2.

These results show that the membrane 3' has a low hydrophilicity, a great protein adsorption and poor heat resistance and compaction resistance.

TABLE 1

| Properties | Water flux[1] | Water flux after heat treatment[2] | Water flux after 2 hours of filtration | % BSA rejection | Contact angle with water | BSA adsorption (mg/g) |
|---|---|---|---|---|---|---|
| Example 1 | 81 | — | — | 99.5 | 54° | 2.2 |
| Example 2 | 363 | 357 | 350 | 99 | 48° | 2.9 |
| Example 3 | 380 | 337 | 360 | 90 | 47° | 1.6 |
| Example 4 | 250 | 250 | — | 90 | 49° | <0.1 |
| Example 5 | 108 | 110 | — | 99 | 46° | 2.5 |
| Example 6 | 979 | 979 | 965 | 99 | 48° | 2.2 |
| Example 7 | 210 | 109 | — | 91 | 72° | 1.5 |
| Example 8 | 162 | — | — | 99 | — | — |
| Example 9 | 352 | 350 | — | 99 | 68° | 17 (0)[3] |
| Example 10 | 432 | 411 | — | 98 | 42° | 0.3 |

[1] Flux unit: $l/m^2$-h-kg-$cm^{-2}$;
[2] 80° C., 30 min.;
[3] Figure in the parenthesis indicates γ-globulin adsorption

TABLE 2

| Properties | Water flux[1] | Water flux after heat treatment[2] | Water flux after 2 hours of filtration | % BSA rejection | Contact angle with water | BSA adsorption (mg/g) |
|---|---|---|---|---|---|---|
| Comparative Example 1 | 314 | 180 | 207 | 98 | 72° | 18 (17.6)[3] |
| Comparative Example 2 | 315 | 160 | 192 | 98 | 69° | 15 |
| Comparative Example 3 | 356 | 73 | — | 92 | 80° | 16 |

[1] Flux unit: $l/m^2$-h-kg-$cm^{-2}$;
[2] 80° C., 30 min.;
[3] Figure in the parenthesis indicates γ-globulin adsorption According to the results set forth in Tables 1 and 2, the comparison of the evaluation of the porous materials obtained in Examples 2, 3 and 7 with that of the porous materials obtained in Comparative Examples 1, 2 and 3 shows that the porous material of the present invention exhibits a high hydrophilicity, a small protein adsorption and excellent heat resistance and compaction resistance.

Further, the comparison of the evaluation of the porous materials obtained in Examples 2, 9 and 10 shows that the porous material of the present invention can be controlled particularly in chemical and biological properties such as non-adsorptivity and selective adsorptivity of protein.

In accordance with the preparation process of the present invention, a porous material excellent in physical properties, e.g., mechanical strength and heat resistance can be easily prepared at a high productivity. In accordance with the preparation process of the present invention, a microporous membrane excellent in physical and biological properties, e.g., fouling resistance, compaction resistance and heat resistance can also be prepared. The preparation process of the present invention further makes it possible to introduce various functional groups into the surface of the porous material and control the pore diameter over a wide range.

The porous material of the present invention is excellent in physical properties such as strength, hardness and heat resistance as well as in chemical and biological properties such as non-adsorptivity and selective adsorptivity of protein.

While the invention has been described in detail and with reference to specific embodiments thereof, it will be apparent to one skilled in the art that various changes and modifications can be made therein without departing from the spirit and scope thereof.

What is claimed is:

1. A process for the preparation of a porous material, which comprises shaping a polymerizable solution (I) containing as essential components a crosslinking-polymerizable vinyl monomer and/or oligomer (a) which is a mixture of (I) a monofunctional monomer and /or oligomer having a hydrophilic structure moiety covalently having a hydrophilic group which is selected from the group consisting of polyethylene glycol group, polyoxymethylene group, saccharide containing group, amide group, carboxyl group, sulfonic group, phosphorous acid group, amine group, ammonium group, amino acid-containing group and ammonium/phosphoric acid containing group, and (ii) a multi functional monomer and or oligomer free of hydrophilic structure, and a solvent (B) capable of dissolving said monomer and/or oligomer (a), crosslinking-polymerizing the polymerizable solution I to produce a gel formed product of crosslinked polymer (A);

subjecting the crosslinked polymer (A) to gelation, and allowing the gel formed product to come in contact with a coagulation solution © which is compatible with said solvent (B) but doesn't subject said crosslinked polymer (A) to gelation so that it is coagulated and rendered porous, wherein said polymerizable solution (I) comprises at least one non-crosslinked polymer which is soluble in said solvent (B) but insoluble in said coagulation solution © and is selected from the group consisting of polysulfone polymer, amide polymer, imide polymer, styrene polymer and cellulose polymer, said membrane exhibits a contact angle of not more than 55 degrees with respect to water.

2. The process for the preparation of a porous material according to claim 1, wherein the content of said crosslinking-polymerizable vinyl monomer and/or oligomer (a) in the resin component contained in said polymerizable solution (I) is from 10 to 90% by weight.

3. The process for the preparation of a porous material according to claim 1, wherein said crosslinking-polymerizable vinyl monomer and/or oligomer (a) comprises a multifunctional monomer and/or oligomer in an amount of not less than 10% by weight.

4. The process for the preparation of porous material according to claim 1, wherein the content of said hydrophilic vinyl monomer and/or oligomer in the resin component contained in said polymerizable solution (I) is from 5 to 50% by weight.

5. The process for the preparation of a porous material according to claim 1, wherein said hydrophilic vinyl monomer and/or oligomer is a (meth)acrylic monomer and/or oligomer.

6. The process for the preparation of a porous material according to claim 1, wherein said vinyl monomer and/or oligomer having an amino acid skeleton in its molecule in the resin component contained in said polymerizable solution (I) is from 5 to 50% by weight.

7. The process for the preparation of a porous material according to claim 6, wherein said vinyl monomer and/or oligomer having an amino acid skeleton in its molecule is a (meth)acrylic monomer and/or oligomer.

8. The process for the preparation of a porous material according to claim 1, wherein said crosslinking-polymerizable vinyl monomer and/or oligomer (a) is one containing a vinyl monomer and/or oligomer having a saccharide skeleton in its molecule.

9. The process for the preparation of a porous material according to claim 8, wherein the content of said vinyl monomer and/or oligomer having a saccharide skeleton in its molecule in the resin component contained in said polymerizable solution (I) is from S to 50% by weight.

10. The process for the preparation of a porous material according to claim 9, wherein said vinyl monomer and/or oligomer having a saccharide skeleton in its molecule is a (meth)acrylic monomer and/or oligomer.

11. The process for the preparation of a porous material according to any one of claims 1 to 10, wherein said solvent (B) is one having a boiling point of 80° C. to 180° C.

12. The process for the preparation of a porous material according to any one of claims 1 to 10, wherein the shaping of said polymerizable solution (I) is followed by crosslinking polymerization by irradiation with energy ray.

13. The process for the preparation of a porous material according to claim 12, wherein said energy ray is ultraviolet ray.

14. The process for the preparation of a porous material according to any one of claims 1 to 10, wherein said coagulating solution (C) is water or an aqueous solution.

15. The process for the preparation of a porous material according to any one of claims 1 to 10, wherein said polymerizable solution (I) is shaped into plane membrane, tubular membrane or hollow fiber membrane.

16. A porous material, made of semi IPN (semi-interpenetrating polymer network polymer alloy of a crosslinked polymer (A) with a non-crosslinked polymer (D), said porous material being obtained by a process which comprises shaping a polymerization solution (I) containing as essential components a crosslinked-polymerizable vinyl monomer and/or oligomer (a) which is a mixture of (I) a monofunctional monomer an/or oligomer having a hydrophilic structure moiety covalently having a hydrophilic group which is selected from the group consisting of polyethylene glycol group, polyoxyethylene group, saccharide group, amide group, carboxyl group sulfonic, phosphoric acid group, and (ii) a multi functional monomer and/or oligomer free of hydrophilic structure moiety and a solvent (B) capable of dissolving said monomer and/or oligomer (a);

crosslinking-polymerizing the polymerization solution (I) to produce a gel formed product of crosslinked polymer (A), subjecting the crosslinked polymer (A) to gelation, and allowing the gel formed product to come in contact with a coagulation solution © which is compatible with said solvent (B) but doesn't subject said crosslinked polymer (A) to gelation so that it is coagulated and rendered porous, wherein said polymerizable solution (I) comprises at least one non-crosslinked polymer (D) which is soluble in said solvent (B) but insoluble in coagulating solution (C) and is selected for the group consisting of polysulfone polymer, amide polymer, imide polymer, styrene polymer and cellulose polymer, said membrane exhibits a contact angle of not more than 55 degrees with respect to water.

17. The porous material according to claim 14, wherein the content of said non-crosslinked polymer (D) is from 10% to 90% by weight.

18. The process for the preparation of porous material of claim 1, wherein said crosslinking polymerizable vinyl monomer and/or oligomer (a) contain an amino acid skeleton in its molecule.

* * * * *

UNITED STATES PATENT AND TRADEMARK OFFICE
CERTIFICATE OF CORRECTION

PATENT NO. : 6,319,404 B1
DATED : November 20, 2001
INVENTOR(S) : Zhang et al.

It is certified that error appears in the above-identified patent and that said Letters Patent is hereby corrected as shown below:

<u>Column 27,</u>
Line 48, "from S to 50" should be -- from 5 to 50 --.

Signed and Sealed this

Tenth Day of September, 2002

Attest:

Attesting Officer

JAMES E. ROGAN
*Director of the United States Patent and Trademark Office*

UNITED STATES PATENT AND TRADEMARK OFFICE
CERTIFICATE OF CORRECTION

PATENT NO.   : 6,319,404 B1
DATED        : November 20, 2001
INVENTOR(S)  : Zhang et al.

It is certified that error appears in the above-identified patent and that said Letters Patent is hereby corrected as shown below:

Column 26,
Line 67, "©" should be -- (C) --.

Column 27,
Line 6, "©" should be -- (C) --.

Column 28,
Lines 15 and 16, "IPN (semi-interpenetrating polymer network polymer" should be
-- IPN (semi-interpenetrating polymer network) polymer --.
Line 36, "©" should be -- (C) --.

Signed and Sealed this

Twenty-fourth Day of June, 2003

JAMES E. ROGAN
*Director of the United States Patent and Trademark Office*